United States Patent
Gerhart et al.

(10) Patent No.: US 7,274,449 B1
(45) Date of Patent: Sep. 25, 2007

(54) SYSTEM FOR DETERMINING STOKES PARAMETERS

(75) Inventors: Grant R. Gerhart, Bloomfield Hills, MI (US); Roy M. Matchko, Payson, AZ (US)

(73) Assignee: United States of America as represented by the Secretary of the Army, Washington, DC (US)

( * ) Notice: Subject to any disclaimer, the term of this patent is extended or adjusted under 35 U.S.C. 154(b) by 102 days.

(21) Appl. No.: 11/158,357

(22) Filed: Jun. 20, 2005

(51) Int. Cl.
*G01J 4/00* (2006.01)

(52) U.S. Cl. .................................................. 356/364

(58) Field of Classification Search ................ 356/364, 356/365, 368, 366, 367, 369; 250/225, 559.09; 348/135
See application file for complete search history.

(56) References Cited

U.S. PATENT DOCUMENTS

| | | | |
|---|---|---|---|
| 3,759,618 A * | 9/1973 | Rogers et al. .............. | 356/619 |
| 4,019,819 A | 4/1977 | Lodzinski | |
| 4,159,874 A | 7/1979 | Dearth et al. | |
| 4,478,513 A | 10/1984 | Skinner et al. | |
| 5,396,329 A * | 3/1995 | Kalawsky ................... | 356/364 |
| 5,734,473 A * | 3/1998 | Gerhart et al. .............. | 356/364 |
| 5,949,480 A * | 9/1999 | Gerhart et al. .............. | 348/135 |
| 6,061,091 A | 5/2000 | Van de Poel et al. | |
| 6,204,924 B1 | 3/2001 | Cyr | |
| 6,339,426 B1 | 1/2002 | Lui et al. | |
| 6,373,614 B1 * | 4/2002 | Miller ........................ | 359/237 |
| 6,393,145 B2 | 5/2002 | Betrisey et al. | |
| 6,552,836 B2 * | 4/2003 | Miller ........................ | 359/237 |
| 6,563,582 B1 | 5/2003 | Chun | |
| 6,721,050 B2 * | 4/2004 | Vecer et al. ................ | 356/364 |
| 6,804,003 B1 | 10/2004 | Wang et al. | |
| 6,822,737 B2 | 11/2004 | Kurata et al. | |

(Continued)

OTHER PUBLICATIONS

U.S. Appl. No. 10/822,355, filed Apr. 13, 2004, Gerhart, et al, Simultaneous 4-Stokes parameter determination using a single digital image.

(Continued)

*Primary Examiner*—Roy M. Punnoose
(74) *Attorney, Agent, or Firm*—David L. Kuhn; Thomas W. Saur; Luis Miguel Acosta

(57) ABSTRACT

A system for determining polarization profiles of points in a scene from video frames using Stokes parameters includes a scene having a region that emits scene light rays that correspond to the points in the scene, a color filter, a Stokes filter that includes a rotating retarder having angular positions $\Omega$, and a first linear polarizer having a transmission axis, a correlator that emits a correlator light ray, and that comprises a uniform light source, a second linear polarizer, and a fixed retarder, a video camera having a video frame, and a computer system. The scene light rays and the correlator light ray are substantially simultaneously transmitted through the color filter and the Stokes filter to the video camera, images corresponding to the scene light rays and the correlator light ray are projected onto respective pixels in the video frame and recorded as two-dimensional (2-D) arrays, and when the transmission axis of the first linear polarizer is fixed, the images corresponding to the scene light rays and the correlator light ray from four unique ones of the angular positions $\Omega$ of the rotating retarder are used by programming in the computer system to calculate respective Stokes parameters of the points in the scene.

8 Claims, 5 Drawing Sheets

U.S. PATENT DOCUMENTS

| | | |
|---|---|---|
| 6,822,738 B1 | 11/2004 | Johs et al. |
| 6,856,710 B2 | 2/2005 | Wein et al. |
| 7,218,398 B2 * | 5/2007 | Smith .................... 356/367 |
| 2002/0181066 A1 * | 12/2002 | Miller .................... 359/237 |
| 2004/0056966 A1 | 3/2004 | Schnechner et al. |

OTHER PUBLICATIONS

A. Gerrard and J. M. Burch, Introduction to Matrix Methods in Optics, Dover Publicatons, N. Y., p. 196 (1994).

Roy M. Matchko and Grant R. Gerhart, Polarization measurements using a commercial off-the-shelf digital camera, Optical Engineering 44(2), 023604 (Feb. 2005), pp. 023604-1 to 023604-10.

Roy M. Matchko and Grant R. Gerhart, Polarization azimuth angle in daylight scenes, Optical Engineering 44(2), 028001 (Feb. 2005), pp. 028001-1 to 028001-9.

* cited by examiner

SYSTEM FOR DETERMINING STOKES PARAMETERS

GOVERNMENT INTEREST

The invention described here may be made, used and licensed by and for the U.S. Government for governmental purposes without paying royalty to us.

BACKGROUND OF THE INVENTION

1. Field of the Invention

The present invention generally relates to a system and method for determining Stokes parameters.

2. Background Art

The Stokes method provides a seminal method for the determination of a state of polarization of a beam of light using measurable quantities. The Stokes method includes the process of measuring four intensities of the light beam. Each measurement corresponds to the intensity of the light beam after the light beam passes through each of four different filter system arrangements. The four Stokes parameters, by convention, are generally designated $S_0$, $S_1$, $S_2$, and $S_3$. The four Stokes parameters are derived from the four measured light beam intensities, and form a four-element column vector in four-dimensional mathematical space.

Since the discovery of the Stokes method in 1852, many conventional filter systems based on the Stokes method have been developed. Typically, in conventional approaches four separate, unique images are used to calculate the Stokes parameters for each element in a scene. A manually rotated retarder and a linear polarizer are used in conventional approaches to obtain the data used for determining the Stokes parameters.

However, the conventional approaches of using the Stokes parameters for acquiring polarization information from images have the deficiencies of sometimes having errors in temporal registration and in spatial registration. The temporal registration errors occur because of the capture time differential to generate separate images in conventional approaches. The capture time differential can affect polarization measurements that are taken outdoors when changing sun position, cloud position, and the like change the intensity or the polarization state of the light entering the filter system. Indoors (e.g., in a laboratory), temperature, atmospheric pressure, and density or concentration of variations associated with scene elements can change the polarization state of the light entering the filter system during the time duration used to record four separate images.

Spatial registration errors can occur when conventional approaches are used whenever the scene is imaged onto the image plane of the camera from different positions. For example, when four adjacent lenses are used to simultaneously image the scene on the image plane of the camera, each lens will obtain an image of the scene from a slightly different perspective. As such, the four images will be different, and spatial errors can occur.

Thus, there exists a need and an opportunity for an improved system and an improved method for the determination of polarization profiles of points in a scene from video frames. Such an improved system and method may overcome one or more of the deficiencies of the conventional approaches.

SUMMARY OF THE INVENTION

Accordingly, the present invention may provide an improved system and an improved method for the determination of polarization profiles of points in a scene from video frames. The present invention generally reduces or eliminates temporal errors and spatial errors when compared to conventional approaches for determining Stokes parameters. The present invention generally comprises a correlator, a color filter, a motorized rotating retarder, a linear polarizer, and a video camera.

The correlator generally comprises a uniform light source, a linear polarizer, and a birefringent material. The correlator generally associates a particular video frame with a corresponding position of a fast axis of the rotating retarder.

Light from points in a scene are generally transmitted through the system and exit from the system having respective intensities that may be uniquely attenuated for each wavelength of the light. A narrowband color filter is generally used to select a particular wavelength. The respective attenuated intensities in each of four scene-images are used to calculate the Stokes parameters for selected points in the scene for the selected wavelength.

The system and method of the present invention may express the Stokes parameters explicitly as a function of wavelength. As such, the present invention may overcome the deficiency of the different phase differential for each individual wavelength that is introduced by the retarder in conventional approaches.

A polarization standard that generally comprises a linear polarizer and a circular polarizer of known azimuth and ellipticity angle may be included in the imagery to provide testing for the introduction of pseudo polarization parameters. The Stokes parameters may be calculated for each point in the scene.

A unique pseudo-color scheme that utilizes a Poincare sphere may be used to encode and display polarization parameters. The pseudo-color scheme generally associates the respective red-green-blue (RGB) values of an image with normalized values of the Stokes parameters.

The present invention generally provides for obtaining the four Stokes parameters more rapidly when compared with conventional approaches. The present invention may provide for the generation of video images having changing polarization, and may reduce, minimize or eliminate spatial and temporal registration errors when compared to conventional approaches.

According to the present invention, a system for determining polarization profiles of points in a scene from video frames using Stokes parameters is provided. The system comprises correlator that emits correlator light rays, and that comprises a uniform light source, a fixed linear polarizer, and a fixed retarder, a scene having a region that emits scene light rays that correspond to the points in the scene, a color filter, a Stokes filter that includes a rotating retarder and a linear polarizer having a fixed transmission axis, a video camera having a video frame, and a computer system. The scene light rays and the correlator light rays are substantially simultaneously transmitted through the color filter and the Stokes filter to the video camera. Images corresponding to the scene light rays and the correlator light rays are projected onto respective pixels in the video frame and recorded as two-dimensional (2-D) arrays. The images corresponding to the scene light rays and the correlator light rays from four unique angular positions $\Omega$ of the rotating retarder are used by programming in the computer system to calculate respective Stokes parameters of the points in the scene.

Further, according to the present invention, a method of reducing spatial and temporal errors in polarization profiles of points in a scene from video frames using Stokes parameters is provided.

The above features, and other features and advantages of the present invention are readily apparent from the following detailed descriptions thereof when taken in connection with the accompanying drawings.

DETAILED DESCRIPTION OF THE PREFERRED EMBODIMENT(S)

Figure 1:
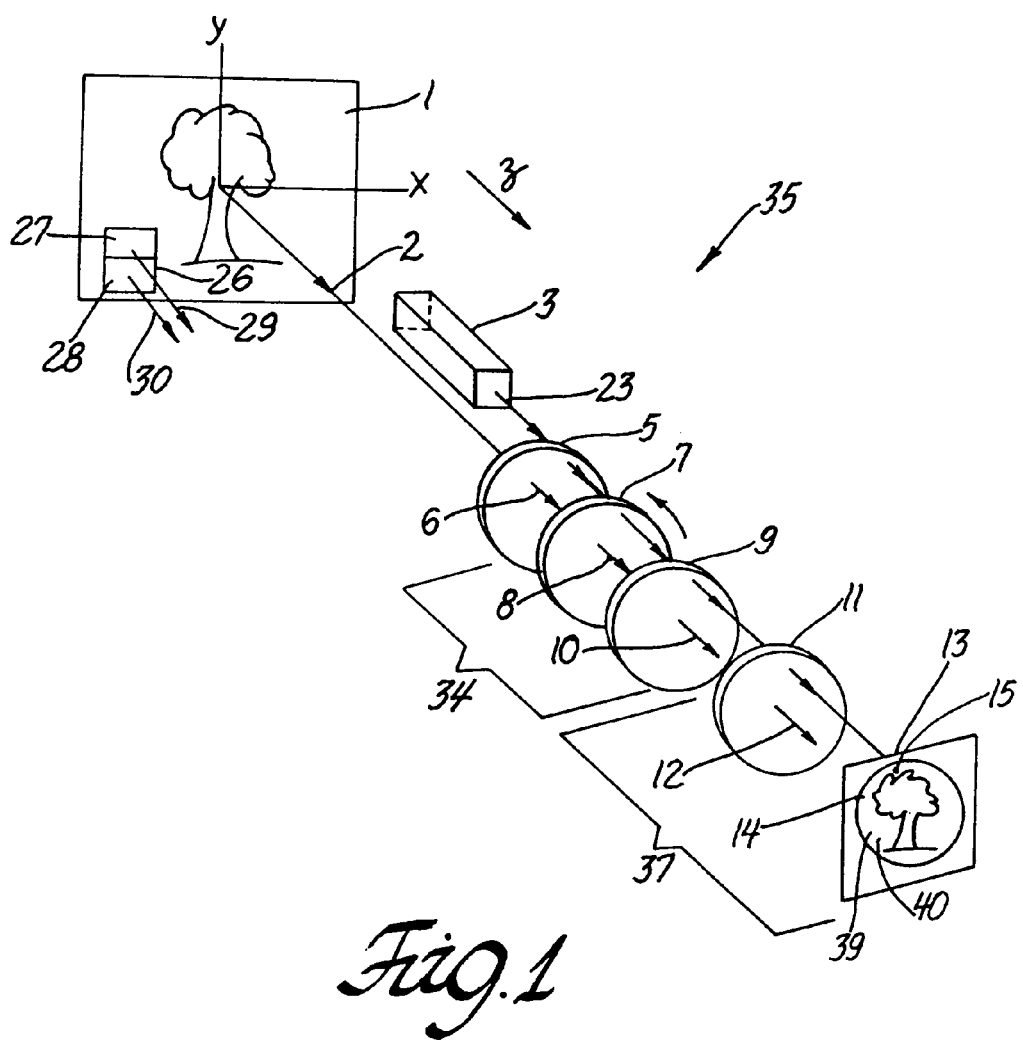
FIG. 1 is a diagram of an optical system according to the present invention.

With reference to the Figures, the preferred embodiments of the present invention will now be described in detail. Generally, the present invention provides an improved system and an improved method for the determination of polarization profiles of points in a scene from video frames using Stokes parameters. Light originating from a correlator may be transmitted through a color filter, a motorized rotating retarder, a linear polarizer, and may be focused onto a video frame of a video camera. Light from a scene and a polarization standard may also be transmitted through the color filter, the motorized rotating retarder, and the linear polarizer, and may be focused onto the same video frame of the video camera as the light from the correlator.

The present invention may reduce or eliminate temporal registration errors when compared to conventional approaches for using Stokes parameters by implementing a precision motor for the rotation of the retarder in connection with the implementation of a polarization standard. Because positive ellipticity is generally introduced into the imagery when the light increases between exposures and negative ellipticity is generally introduced into the imagery when the light decreases between exposures, the present invention may include the polarization standard in the scene to determine the validity of the data. The polarization standard generally comprises a linear polarizer and a circular polarizer.

The present invention may reduce or eliminate spatial registration errors when compared to conventional approaches by implementing a single lens for imaging onto the image plane of the video camera.

The system and method of the present invention generally provide for determining polarization profiles of a scene. The present invention generally comprises the polarization calibration standard, the correlator, the motorized rotating retarder, the first linear polarizer, and the video camera in connection with a Stokes filter. The polarization calibration standard generally comprises a calibrated linear polarizer and a calibrated circular polarizer.

The correlator generally comprises a uniform light source, a linear polarizer, and a birefringent material (i.e., an optically anisotropic material such as calcite and quartz that generally provides the splitting of a light wave into two transmitted waves having different velocities). The correlator generally correlates a particular video frame with a corresponding position of a fast axis of the motorized rotating retarder.

The Stokes filter generally comprises the motor (generally a precision speed motor) for rotation of a retarder, and a fixed (i.e., non-rotating) linear polarizer. The present invention generally calculates the four Stokes parameters (i.e., the parameters $S_0$, $S_1$, $S_2$, and $S_3$) for each individual image pixel using four two-dimensional (2-D) images from the video camera and appropriate polarization determination equations.

Light from two independent sources (e.g., the scene and the correlator) may be substantially simultaneously transmitted through a color filter and through the Stokes filter. The Stokes filter generally comprises the motorized rotating retarder and the fixed linear polarizer. The light that exits the Stokes filter has generally been attenuated by the Stokes filter and may be recorded using the video camera. The video camera generally includes a charge coupled device (CCD) array of light receptors that operate to form respective pixels of a video frame.

The Stokes filter generally determines the intensity (i.e., level, amount, amount, etc.) of the attenuation to the light transmitted through the system of the present invention. The present invention may generate uniquely attenuated images of the uniform light source from the correlator and the light from the scene on each video frame.

The attenuated images of the uniform light source from the correlator generally occupy a relatively small area of the total pixel area of each frame. The attenuated images of the correlator uniform light source may preferably be located along the perimeter of each frame. The image pixels related to the polarization standard may also be preferably located along the perimeter of each frame.

Also according to the present invention, a computer (e.g., processor, microprocessor, controller, etc.) may be implemented with appropriate programming (e.g., software, firmware, and the like) stored in suitable memory (e.g., RAM, PROM, EPROM, EEPROM, flash memory, and the like) to perform processes (i.e., instructions, routines, algorithms, steps, blocks, methods, operations, equations, etc.) including a cropping (e.g., editing) process for the selection of corresponding elements from each frame containing images of the uniform light source from the correlator. A calibration equation may also be implemented via the computer programming to convert respective pixel values to optical densities, and the optical densities may be converted to relative intensities.

The computer programming may further include instructions directed to a process for computing (i.e., calculating, determining, etc.) a mean intensity value for each cropped image containing light from the correlator, and to determine the frame that contains a minimum intensity value. The frame containing the minimum intensity value may be associated with an orientation of the fast axis of the motorized retarder.

Each scene image generally comprises a rectangular array of pixel values (i.e., a matrix) that corresponds to the attenuated intensities of the light that is transmitted through the Stokes filter (i.e., through the motorized rotating retarder and the fixed linear polarizer). The calibration equation generally converts respective pixel values to optical densities and to relative intensities.

Four unique scene images are generally selected as the basis for calculation of the Stokes parameters for each pixel in the scene. Polarization parameters including the degree of polarization, polarization azimuth angle, and polarization ellipticity angle may be calculated for each pixel using the Stokes parameters associated with each pixel value. A unique pseudo-color scheme that utilizes the Poincare sphere may be used for encoding and displaying polarization parameters in the scene.

The present invention generally provides for the association of red-green-blue (RGB) values with normalized values of the Stokes parameters. The present invention generally provides for close to (i.e., nearly, substantially, etc.) real time generation of video images having changing polarization values. The total time duration to acquire four unique images of a scene is generally governed by (i.e., corresponds to, is related to, etc.) the frame rate of the video camera and the rotational speed rating (e.g., RPM rating) of the retarder motor. When the calculated polarization parameters that are obtained from the polarization standard fail to match the respective known values, temporal registration errors or improper conditioning may have occurred and the data is generally considered invalid.

The system and method of the present invention may be advantageously implemented in connection with any appropriate wavelength of light (e.g., visible, infrared, ultraviolet, etc.). The system and method of the present invention may be advantageously implemented in connection with any appropriate video recording protocol or format (e.g., analog, digital, etc.). The computer programming of the present invention may be configured to provide for processing that includes cropping (editing), curve fitting, mathematical calculations, manipulation of video frames, pseudo-coloring of polarization parameters, and conversion of images into at least one standard format.

Figure 2:
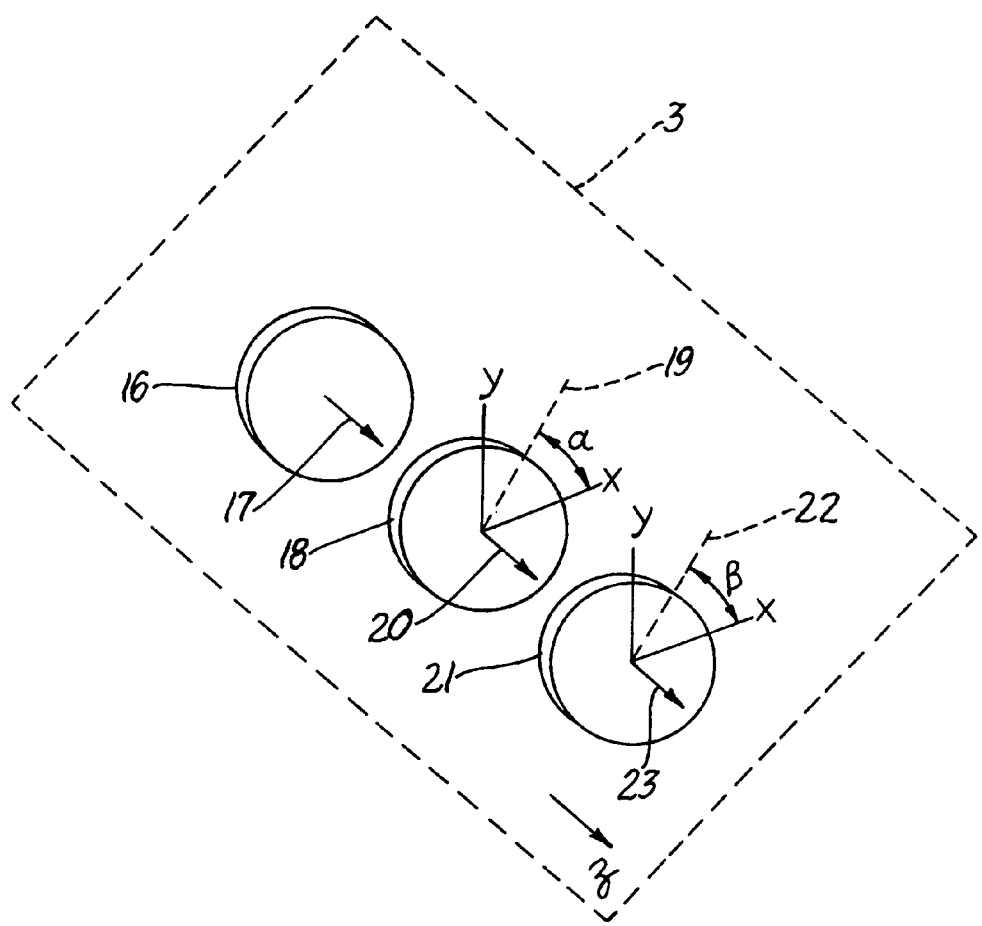
FIG. 2 is a diagram of a correlator according to the present invention.
Figure 3:
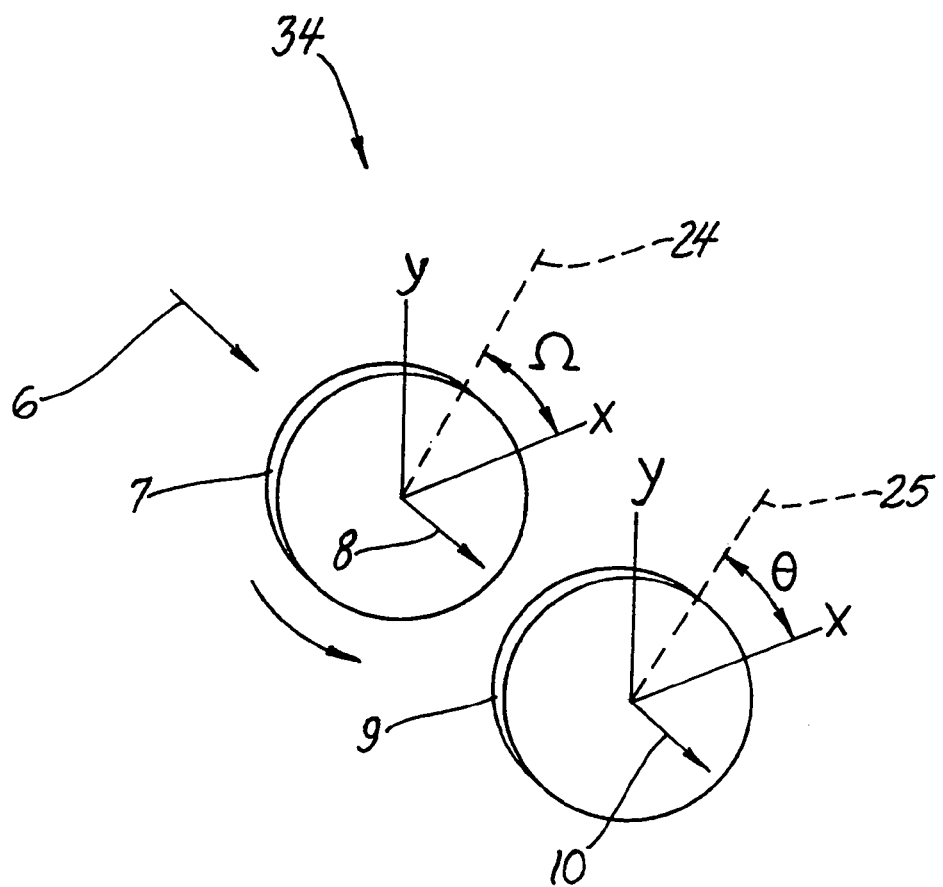
FIG. 3 is a diagram of a Stokes filter according to the present invention.

Referring to FIGS. 1-3, in combination, diagrams illustrating a system 35, and components thereof, of the present invention are shown. The system 35 may be implemented as a system for the determination of polarization profiles of points in a scene 1 from video frames 13 using Stokes parameters (i.e., the parameters $S_0$, $S_1$, $S_2$, and $S_3$). The system 35 of the present invention generally provides at least one system and method for obtaining polarization profiles from a video camera 37. The system 35 of the present invention generally produces (i.e., generates, provides, etc.) a sufficient number of unique scene images 14 to obtain (i.e., generate, calculated, determine, etc.) the respective four Stokes parameters in nearly (i.e., with very insignificant time delay, almost, about, approximately, etc.) real time.

The total time duration to obtain the four images generally used to obtain the four Stokes parameters $S_0$, $S_1$, $S_2$, and $S_3$ for each pixel in the scene is generally regulated by the rotational speed (e.g., revolutions per minute, RPM) of a motorized, rotating retarder (motor not shown) 7 and the frame rate (e.g., frames per second, FPS) of the video camera 37.

The system 35 generally comprises a correlator 3, a color filter 5, a Stokes filter 34 and the video camera 37. The system 35 generally is used in connection with a scene 1 having a horizontal axis, x, and a vertical axis, y (a z axis is generally mutually perpendicular to the x and y axes). The system 35 generally further comprises a polarization standard 26 that is implemented in connection with the scene 1. A user (e.g., operator, etc.) of the system 35 generally desires to obtain polarization information regarding elements of the scene 1.

The Stokes filter 34 generally comprises a rotating retarder (e.g., the retarder 7), and a first linear polarizer 9. The retarder 7 generally comprises an optically transparent, birefringent material such as quartz. However, the retarder 7 may be implemented using any appropriate birefringent material to meet the design criteria of a particular application. The fast axis of the retarder 7 is generally not visible. The retarder 7 is generally implemented as a precision motorized (motor not shown), rotating retarder. The motor is generally implemented having precise rotational speed control such that the angular velocity and angular acceleration of the retarder 7 are controlled within predetermined limits to meet the design criteria of a particular application.

As shown in detail in connection with FIG. 2, the correlator 3 generally comprises a uniform light source 16, a linear polarizer 18 and a retarder 21. The retarder 21 is generally fixed (i.e., non-rotating). The retarder 21 may be implemented using the same material as the retarder 7. The retarder 21 is generally implemented having substantially the same physical (e.g., optical) properties as the retarder 7. The horizontal axis (e.g., x) and the vertical axis (e.g., y) (and mutually perpendicular z axis) of the correlator 3 may be substantially the same as the respective horizontal axis, x and vertical axis, y, (and z axis) of the scene 1.

Returning to FIG. 1, the video camera 37 generally comprises a lens 11 and a video frame 13 that generally includes a scene image 14, a correlator image 15, and polarization standard images 39, 40. The video frame 13 generally comprises an array of charge coupled device (CCD) receptors that may correspond to pixels in the scene 1. However, the video frame 13 may be implemented using any appropriate receptors to meet the design criteria of a particular application. The polarization standard 26 generally comprises a linear polarizer 27 and a circular polarizer 28. The polarization standard 26 is generally implemented in a region of the scene 1 peripheral to points that the user desires to generate corresponding polarization profiles.

A region of the scene 1 generally presents (i.e., emanates, sends, projects, emits, etc.) rays (i.e., beam, light, etc.) 2 that may be received by (i.e., transmitted to) the color filter 5. The ray 2 may be a scene ray. The user of the system 35 generally desires the polarization parameters related to (corresponding to) the region of the scene 1 that presents the rays 2.

The filter 5 may present a respective ray 6 to the retarder 7. The retarder 7 may present a respective ray 8 to the first linear polarizer (i.e., Stokes filter linear polarizer) 9. The linear polarizer 9 may present a respective ray 10 to the lens 11. The lens 11 may present a respective ray 12 to the video frame 13 as the respective scene image 14. Light rays are generally presented in the z axis in the system 35.

As shown in FIG. 2, in connection with the correlator 3, the uniform light source 16 generally presents a ray 17 to the second linear polarizer (i.e., correlator linear polarizer) 18. The linear polarizer 18 may present a respective ray 20 to the second retarder (i.e., non-rotating, fixed, correlator retarder) 21. The retarder 21 (and thus the correlator 3) may present a respective ray 23. The ray 23 may be a correlator ray. The ray 23 is generally transmitted through the Stokes filter 34 to the video camera 37 similarly to the ray 2 from the scene 1, and may form a respective correlator image (e.g., the correlator image 15) on the video frame 13. The image 15 may be integral to (i.e., projected on) a region peripheral to the scene image 14.

Returning again to the FIG. 1, in connection with the polarization standard 26, the linear polarizer (i.e., the polarization standard linear polarizer) 27 may present a ray 29 and the circular polarizer (i.e., the polarization standard circular polarizer) 28 may present a ray 30. The rays 29, 30 are generally a polarization standard linear polarizer ray and a polarization standard circular polarizer ray, respectively. The rays 29, 30 are generally transmitted through the Stokes filter 34 (i.e., through the retarder 7 and the linear polarizer 9) and the camera 37 (i.e., through the lens 11) to the video frame 13, and may form respective polarization standard images 39, 40 on the video frame 13. The image 39 generally corresponds to the ray 29 and the image 40 generally corresponds to the ray 30. The images 39, 40 may be integral to a peripheral region of the scene image 14.

The present invention generally obtains the four Stokes parameters for each pixel in the scene 1 by associating the position of the fast axis of the retarder 7 with a known video frame using the correlator 3. Because the four unique images used to determine the Stokes parameters are not acquired instantaneously (i.e., not substantially simultaneously), the polarization standard 26 may be implemented to provide for testing the validity of recorded data (e.g., recorded versions of the video frame 13).

Data is generally rejected as invalid when the polarization parameters of the standard (e.g., polarization parameters that correspond to the polarization standard images 39, 40) such as degree of polarization, azimuth angles, and ellipticity angles, fail to correspond to respective known (e.g., predetermined, expected, etc.) values (e.g., amounts, levels, etc.). The respective known values are generally obtained (i.e., measured, predetermined, etc.) in a laboratory under controlled lighting and other relevant parameter conditions.

As shown in FIG. 2, the light ray 17 travels from the uniform light source 16 and is transmitted through the linear polarizer 18. A transmission axis 19 of the linear polarizer 18 generally makes an angle, α, with the x-axis and the x-z plane. The exiting attenuated light from the linear polarizer 18 (e.g., the ray 20) is generally transmitted through the retarder 21. The retarder 21 may have a fast axis 22 that generally makes an angle, β, with the x-axis and the x-z plane. The retarder 21 generally causes a phase difference, σ, between components of any given light wave passing therethrough. The phase difference, σ, generally has a different value for different wavelengths of light. In particular, the following relationship generally describes the phase difference, σ, for quartz.

Phase difference,$\sigma=(\pi/2)*((\lambda_T-50.876)/(\lambda-50.876))$ (Equation 1)

where λ is any visible wavelength, and $\lambda_T$ is a particular wavelength that produces, $\sigma=\pi/2$, and is sometimes called the tuned wavelength.

The exiting attenuated light from the retarder 21 (i.e., the ray 23), generally leaves the correlator 3 as elliptically polarized light. The normalized Stokes parameters for the ray 23 can be expressed in terms of α, β, and σ as follows.

$S_0=1$ $S_1=\cos 2(\beta-\alpha)\cos 2\beta+\sin 2(\beta-\alpha)\sin \beta \cos \sigma$ $S2=\cos 2(\beta-\alpha)\sin 2\beta-\sin 2(\beta-\alpha)\cos 2\beta \cos \sigma$ $S_3=\sin(\beta-\alpha)\sin \sigma$ (Equation 2)

When the wavelength, λ, of the ray 20 equals the tuned wavelength, $\lambda_T$, of the retarder 21, the phase difference, $\sigma=\pi/2$ radians (or 90 degrees). Also, when α=45 degrees and β=0 degrees, the Stokes parameters for the ray 23 are generally $\{S_0, S_1, S_2, S_3\}=\{1, 0, 0, -1\}$, and the light ray 23 may be left circularly polarized light. One skilled in the art would understand that appropriate phase differences may be determined for other wavelengths of light in a similar manner.

As the ray 23 exits the correlator 3, the ray 23 is generally transmitted through the color filter 5 as illustrated in FIG. 1. The exiting light (e.g., the ray 6 or similar rays), is generally transmitted through the motorized rotating retarder 7. The retarder 7 generally causes a phase difference, ϵ, between components of any given light wave passing therethrough. The phase difference, ϵ, generally has a different value for different wavelengths of light. In particular, the relationship when quartz is implemented as the birefringent material in the retarder 7 is generally as follows.

Phase difference,$\epsilon=(\pi/2)*((\lambda_T-50.876)/(\lambda-50.876))$ (Equation 3)

One skilled in the art would understand that appropriate relationships may be derived for other birefringent materials (i.e., materials other than quartz). Any appropriate other birefringent materials may be implemented in the present invention to meet the design criteria of a particular application.

Referring to FIG. 3, the retarder 7 may have a fast axis 24 that may be oriented at an angle, Ω, with respect to the x-axis and the x-z plane. In one example, each revolution per minute (RPM) of the retarder 7 may cause the fast axis 24 to rotate 6 degrees per second.

The exiting attenuated light from the retarder 7 (e.g., the ray 8) is generally transmitted through and attenuated by the linear polarizer 9. The linear polarizer 9 generally has a transmission axis 25 oriented at an angle, θ, with respect to the x-axis and the x-z plane. The relative intensity, I, of the exiting light ray 10 can be expressed in terms of Ω, θ, and ϵ and the respective Stokes parameters, $S_0$, $S_1$, $S_2$, and $S_3$, for the light ray 6 as follows (e.g., per Equation (4)).

$I(\Omega,\theta,\epsilon)=0.5\{S_0+(\cos 2\theta-\sin 2\Omega \sin 2(\Omega-\theta)(1-\cos \epsilon))S_1$ $+(\sin 2\Omega \cos 2(\Omega-\theta)-\cos 2\Omega \sin 2(\Omega-\theta)\cos \epsilon)S_2-\sin 2(\Omega-\theta)\sin \epsilon S_3\}$ (Equation 4)

The expression, I(Ω, θ, ϵ), generally denotes (i.e., refers to, represents, etc.) an intensity measurement corresponding to a particular set of values for Ω, θ, and ϵ.

Figure 4:
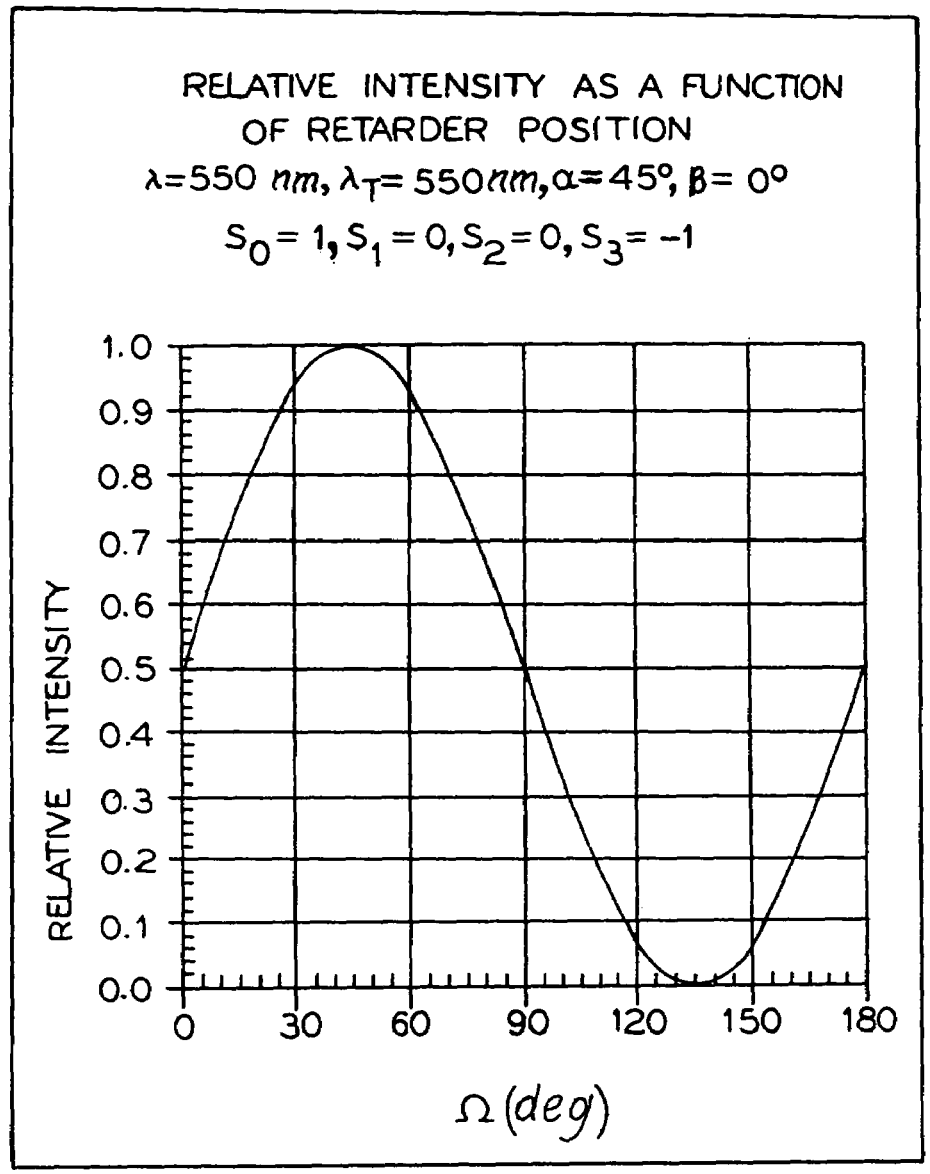
FIG. 4 is a plot of an example of a calibration curve of the correlator of FIG. 2.

Referring to FIG. 4, a plot 60 of Equation 4 when $\{S_0, S_1, S_2, S_3\}=\{1, 0, 0, -1\}$, θ=0, and $\epsilon=\pi/2$ radians (or 90 degrees) is shown. The minimum intensity value of the plot 60 generally occurs when the fast axis 24 of the motorized retarder 7 is oriented at an angle, Ω=135 degrees with respect to the x-axis and the x-z plane. The exiting attenuated light from the retarder 7 and the linear polarizer 9 (e.g., the ray 10 presented by the Stokes filter 34) is generally transmitted through the video camera lens 11. The image 14 of the scene is generally focused onto the video frame 13.

Referring back to FIGS. 1 and 3, light from the scene 1 (e.g., the ray 2) is generally incident upon the color filter 5. The light exiting from the filter 5 (e.g., the ray 6) may be transmitted through the motorized rotating retarder 7. The exiting light from the retarder 7 (e.g., the ray 8) may be transmitted through and attenuated by the linear polarizer 9. The linear polarizer 9 may have a transmission axis 25 that is oriented at the angle, θ, with respect to the x-axis and the x-z plane. The exiting light from the linear polarizer 9 (e.g., the ray 10) may be transmitted through the video camera lens 11. The image 14 of the scene 1 is generally focused (or projected) onto the video frame 13.

All of the video frames (e.g., the video frames 13) are generally downloaded into a computer system (not shown). The images 13 may be stored (e.g., written to memory, held, etc.) for processing by the computer (e.g., controller, processor, etc.) using appropriate programming. Computer programming is generally stored on appropriate media (i.e., memory such as RAM, ROM, PROM, etc., not shown) in the computer system, and, in one example, implemented to crop selected (e.g., chosen, picked, etc.) corresponding picture elements (pixels) from each 2-D image 13. The pixel values of each video image 13 (e.g., the image 14) may form a matrix, M.

Correlation of the angular position of the fast axis 24 of the retarder 7 with frame 13 numbers generally uses intensity measurements, i. Because the Stokes parameters also generally use intensity, I, measurements, and the CCD array in the video camera 37 generally records RGB values, x, a relationship between x and i is generally obtained for the CCD array of all recoded frames 13. In one example, a calibration method for obtaining the relationship between x and I is to pass a beam (or ray) of light through neutral density filters of different optical densities, y, and to record (or otherwise determine) an average x value for each respective y value. One of ordinary skill in the art would understand that the x and y of the intensity, i, relationship (e.g., Equations 5-7 below) is generally different from the relative directions x and y. Curve-fitting (e.g., as performed using programming via the computer system) generally yields y as a function of x as follows.

$$y=f(x) \qquad \text{(Equation 5)}$$

Because some CCD arrays may be implemented as multichannel arrays, a relationship between RGB values, x, and optical densities, y, is generally obtained for each channel. The optical density, y, is generally related to the intensity, I, using the relationship as follows.

$$i=10^{-y} \qquad \text{(Equation 6)}$$

The equation 5 may be substituted into the equation 6 to yield a CCD calibration relationship as follows.

$$i=10^{-f(x)} \qquad \text{(Equation 7)}$$

Using the equation 7, each pixel value, x, in each of the matrices $M_1, M_2, M_3 \ldots M_n$ can be converted to a respective intensity value in new intensity matrices $I_1, I_2, I_3 \ldots I_n$.

To obtain the Stokes parameters for each point in the scene 1, a correlation between the angular position of the fast axis 24 of the rotating retarder 7 and video frame numbers is generally obtained. The correlation between the angular position of the fast axis 24 and video frame numbers may be performed by calculating a mean values for the intensity matrices $I_1, I_2, I_3 \ldots I_n$ for all video frames that specifically relate to the uniform light source 16 of the correlator 3 (e.g., that relate to the images 15).

The computer system may have programming that may be implemented to determine (i.e., calculate, select, choose, etc.) that frame 13 containing the minimum intensity, i. Using a calibration curve such as the plot 60, the frame 13 containing the minimum intensity, i, is generally associated with a specific orientation, $\Omega$, of the fast axis 24 of the retarder 7.

Figure 5:
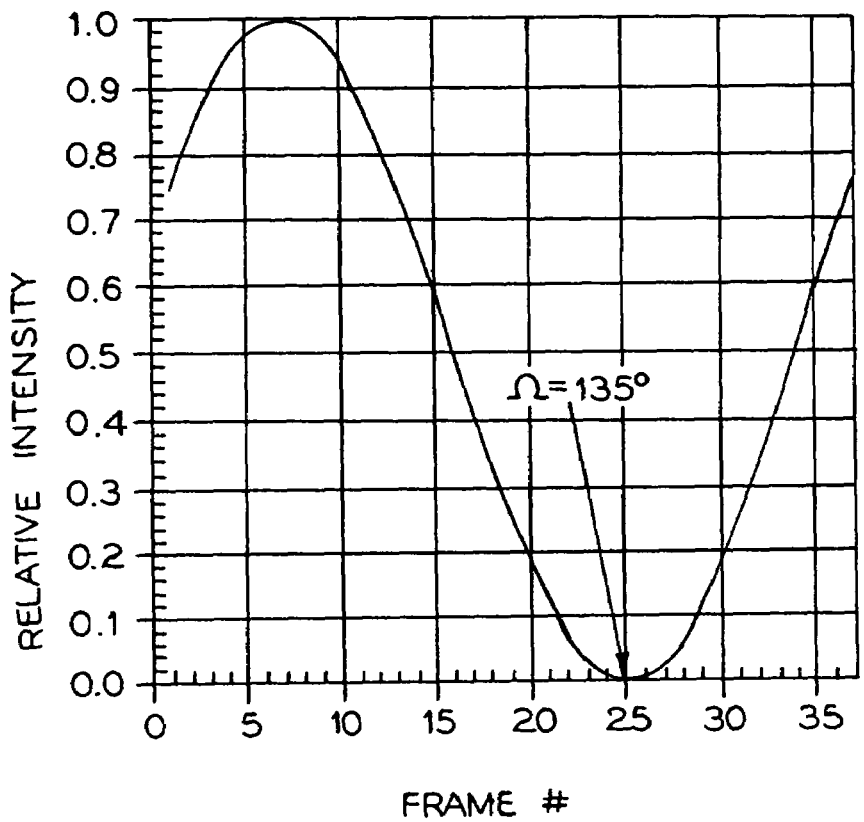
FIG. 5 is a plot of an example relationship between light beam intensities and video frame number.

Referring to FIG. 5, a plot 62 illustrating the intensities $I_1, I_2, I_3 \ldots I_n$ as a function of video frame number for the mean intensities that relate to a correlator that produces (e.g., generates, yields, etc.) circularly polarized light is shown. The plot 60 illustrates a minimum intensity that occurs for $\Omega=135$ degrees. The plot 62 illustrates that a frame 25 contains a minimum. As such, $\Omega=135$ degrees for the frame 25.

When, in one example, the frame rate of the video camera 37 is 30 frames per second and the retarder 7 has a rotational rate of 25 RPM, the retarder 7 generally rotates 5 degrees per video frame. As such, minimum intensities generally occur at every 36 frames (i.e., at every 180 degrees or $\pi$ radians). Under the conditions for the example, $\Omega=135$ degrees for the frames 25, 61, 97, and so forth, $\Omega=140$ degrees for the frames 26, 62, 98, and so forth, and similar values for $\Omega$ and the respective frames may be determined for any desired intensities. One skilled in the art would understand that appropriate relationships may be derived for other retarder 7 rotational speeds and video camera 37 frame rates to meet the design criteria of a particular application. Any appropriate other birefringent material may be implemented in the present invention to meet the design criteria of a particular application.

When a correlation is established (i.e., calculated, determined, etc.) between intensities, i, and angular position, $\Omega$, for video frames (e.g., the frames 13) that comprise scene images (e.g., the images 14), the parameters $I(\Omega, \theta, \epsilon), \Omega, \theta,$ and $\epsilon$ are generally known with respect to the equation 1 for all video frames 13. The parameters that are generally unknown are the four Stokes parameters (i.e., $S_0, S_1, S_2, S_3$). When the transmission axis 25 of the linear polarizer 9 is fixed, four unique (e.g., distinct, different, etc.) positions of the motorized retarder 7 ($\Omega_1, \Omega_2, \Omega_2, \Omega_4$) are generally used to solve for the Stokes parameters $S_0, S_1, S_2, S_3$.

Referring to one example implementation of the equation 1, when $$a=\cos 2\theta - \sin 2\Omega \sin 2(\Omega-\theta)(1-\cos \epsilon)$$

$$b=\cos 2(\Omega-\theta)\sin 2\Omega - \sin 2(\Omega-\theta)\cos 2\Omega \cos \epsilon, \text{ and}$$

$$c=-\sin 2(\Omega-\theta)\sin \epsilon, \qquad \text{(Equations 8)}$$

$$2I(\Omega, \theta, \epsilon)=S_0+aS_1+bS_2+cS_3. \qquad \text{(Equation 9)}$$

Using four unique positions for the retarder 7 (i.e., the positions $\Omega_1, \Omega_2, \Omega_2, \Omega_4$), the following relationships may be described.

$$2I(\Omega_1, \theta, \epsilon)=S_0+a_1S_1+b_1S_2+c_1S_3$$

$$2I(\Omega_2, \theta, \epsilon)=S_0+a_2S_1+b_2S_2+c_2S_3$$

$$2I(\Omega_3, \theta, \epsilon)=S_0+a_3S_1+b_3S_2+c_3S_3$$

$$2I(\Omega_4, \theta, \epsilon)=S_0+a_4S_1+b_4S_2+c_4S_3 \qquad \text{(Equations 10)}$$

Using matrix notation, $$I = \begin{vmatrix} |I_1| \\ |I_2| \\ |I_3| \\ |I_4| \end{vmatrix}, k = \begin{vmatrix} |1 a_1 b_1 c_1| \\ |1 a_2 b_2 c_2| \\ |1 a_3 b_3 c_3| \\ |1 a_4 b_4 c_4| \end{vmatrix}, S = \begin{vmatrix} |S_1| \\ |S_2| \\ |S_3| \\ |S_4| \end{vmatrix} \qquad \text{(Equations 11)}$$

The four Stokes parameters may be obtained form a relationship as follows.

$$S=k^{-1}I \qquad \text{(Equation 12)}$$

Each of the corresponding elements in the matrices $S_0, S_1, S_2, S_3$ (e.g., elements $s^{(0)}{}_{11}, s^{(1)}{}_{11}, s^2{}_{11}$, and $s^{(3)}{}_{11}$) are generally associated with a point (x, y) (i.e., a point having Cartesian coordinates with respective horizontal and vertical values x and y) in the scene 1. Thus, the polarization state of points (x, y) in the scene 1 can be determined (e.g., calculated using programming that may be stored in a medium in the computer system) using the relationships as follows.

$$\sin 2\chi = S_3/(S_1^2+S_2^2+S_3^2)^{1/2}$$

$$\tan 2\psi = S_2/S_1$$

$$P = (S_1^2 + S_2^2 + S_3^2)^{1/2}/S_0, \quad \text{(Equations 13)}$$

Where $\chi$ is the polarization ellipticity angle, $\psi$ is the polarization azimuth angle, and P is the degree of polarization.

The polarization standard video images 39, 40 are generally recorded on all of the respective video frames 13 at a region peripheral to the respective scene image 14. In one example, the video images 13 may be recorded via the computer system. However, the video images 13 may be recorded using any appropriate video recording apparatus or system to meet the design criteria of a particular application. A unique pseudo-color scheme that utilizes the Poincare sphere may be used for encoding and displaying polarization parameters in the scene.

As is apparent then from the above detailed description, the present invention may provide an improved system and an improved method for acquiring sufficient data to rapidly measure the four Stokes parameters, when compared to conventional approaches. The present invention may reduce or eliminate temporal errors and spatial errors that can be generated when conventional approaches are implemented.

Various alterations and modifications will become apparent to those skilled in the art without departing from the scope and spirit of this invention and it is understood this invention is limited only by the following claims.

What is claimed is:

1. A system for determining polarization profiles of points in a scene from video frames using Stokes parameters, the system comprising:
    a scene having a region that emits scene light rays that correspond to the points in the scene;
    a color filter;
    a Stokes filter that comprises a rotating retarder having angular positions $\Omega$, and a first linear polarizer having a transmission axis;
    a correlator that emits a correlator light ray, wherein the correlator comprises a uniform light source, a second linear polarizer, and a fixed retarder;
    a video camera having a video frame; and
    a computer system, wherein
        the scene light rays and the correlator light ray are substantially simultaneously transmitted through the color filter and the Stokes filter to the video camera;
        images corresponding to the scene light rays and the correlator light ray are projected onto respective pixels in the video frame and recorded as two-dimensional (2-D) arrays; and
        when the transmission axis of the first linear polarizer is fixed, the images corresponding to the scene light rays and the correlator light ray from four unique ones of the angular positions $\Omega$ of the rotating retarder are used by programming in the computer system to calculate respective Stokes parameters of the points in the scene.

2. The system of claim 1 further comprising a polarization standard at a region in the scene separate from the region of the scene that emits the scene light rays, wherein:
    the polarization standard comprises a third linear polarizer that emits a third linear polarization standard light ray, and a circular polarizer that emit a circular polarization standard light ray, wherein
    the third linear polarization standard light ray, and the circular polarization standard light ray are transmitted through the color filter and the Stokes filter to the video camera,
    images corresponding to the third linear polarization standard light ray and the circular polarization standard light ray are projected onto respective pixels in the video frame and recorded,
    the images corresponding to the third linear polarization standard light ray and the circular polarization standard light ray from the four unique ones of the angular positions $\Omega$ of the motorized retarder that are used by programming in the computer system are used to solve for respective Stokes parameters of the third linear polarization standard light ray and the circular polarization standard light ray, and
    data related to the scene is rejected as invalid when the polarization parameters of the third linear polarization standard light ray and the circular polarization standard light ray fail to correspond to respective known values, wherein the respective known values are predetermined in a laboratory under controlled lighting conditions.

3. The system of claim 1 wherein total time duration to obtain the four unique images that are used to obtain the four Stokes parameters for each pixel in the scene is regulated by the rotational speed of the rotating retarder and the frame rate of the video camera, and the system generates a sufficient number of unique scene images to generate the respective four Stokes parameters in nearly real time.

4. The system of claim 1 wherein the rotating retarder and the fixed retarder comprise at least one optically transparent, birefringent material.

5. The system of claim 1 wherein the rotating retarder is implemented as a precision motorized, rotating retarder having precise rotational speed control such that the angular velocity and angular acceleration of the rotating retarder are controlled within predetermined limits.

6. The system of claim 1 wherein the correlator light ray is circularly polarized light, and the fixed retarder has substantially the same optical properties as the rotating retarder.

7. The system of claim 1 wherein the video camera further comprises a lens, and the video frame comprises an array of charge coupled device (CCD) receptors that correspond to the pixels.

8. The system of claim 1 wherein the four Stokes parameters for each pixel in the scene are generated by associating the position of a fast axis of the rotating retarder using values of the respective correlator light ray images.

* * * * *